(12) United States Patent
Yoon et al.

(10) Patent No.: US 10,705,722 B2
(45) Date of Patent: Jul. 7, 2020

(54) MOBILE TERMINAL HAVING DUAL TOUCH SCREEN AND METHOD OF CONTROLLING CONTENT THEREIN

(71) Applicant: SAMSUNG ELECTRONICS CO., LTD., Suwon-si (KR)

(72) Inventors: Soo Yeoun Yoon, Suwon-si (KR); Hui Chul Yang, Seoul (KR); Hyun Jin Kim, Seoul (KR); Yong Gook Park, Yongin-si (KR); Ji Yeon Kwak, Seoul (KR); Ji Hyeon Kweon, Yongin-si (KR); Eun Kyung Yoo, Seoul (KR); Keum Koo Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 15/450,843

(22) Filed: Mar. 6, 2017

(65) Prior Publication Data

US 2017/0177211 A1 Jun. 22, 2017

Related U.S. Application Data

(63) Continuation of application No. 12/691,982, filed on Jan. 22, 2010, now Pat. No. 9,591,122.

(30) Foreign Application Priority Data

Jan. 23, 2009 (KR) ........................ 10-2009-0005966

(51) Int. Cl.
*G06F 3/0488* (2013.01)
*H04M 1/725* (2006.01)
(Continued)

(52) U.S. Cl.
CPC ...... *G06F 3/04883* (2013.01); *G06F 3/04817* (2013.01); *G06F 3/04845* (2013.01);
(Continued)

(58) Field of Classification Search
CPC ............ G06F 3/03547; G06F 3/04817; G06F 3/0482; G06F 3/04886; G06F 3/017;
(Continued)

(56) References Cited

U.S. PATENT DOCUMENTS 6,347,290 B1 *  2/2002  Bartlett ................ G06F 1/1626
                                                    702/150
6,958,749 B1 * 10/2005  Matsushita ........... G06F 3/0416
                                                    178/18.03
(Continued)

FOREIGN PATENT DOCUMENTS

CN        101089800        12/2007
CN        101133385         2/2008
(Continued)

OTHER PUBLICATIONS

Communication dated Nov. 2, 2017, from the European Patent Office in counterpart European Application No. 17184106.7.
(Continued)

*Primary Examiner* — Jung-Mu T Chuang
(74) *Attorney, Agent, or Firm* — Sughrue Mion, PLLC

(57) ABSTRACT

A terminal device having a dual touch screen capable of controlling a content is disclosed. The terminal device displays at least one content to a display unit. A processor coupled to the terminal is configured to checking content mapped to an area at which a touch event is detected and released from the dual touch screen including a first touch sensor and a second touch sensor and to control the content according to the touch event.

16 Claims, 20 Drawing Sheets

(51) Int. Cl.
*G06F 3/0481* (2013.01)
*G06F 3/0484* (2013.01)

(52) U.S. Cl.
CPC .............. *H04M 1/72583* (2013.01); *G06F 2203/04806* (2013.01); *G06F 2203/04808* (2013.01); *H04M 1/72558* (2013.01); *H04M 2250/22* (2013.01)

(58) Field of Classification Search
CPC .... G06F 3/04883; G06F 3/0488; G06F 3/016; G06F 3/04845; G06F 2203/04806; G06F 2203/04808; H04M 1/72583; H04M 1/72558; H04M 2250/22
See application file for complete search history.

(56) References Cited

U.S. PATENT DOCUMENTS

| | | | |
|---|---|---|---|
| 7,880,732 B2 * | 2/2011 | Goertz | G06F 3/0421 345/175 |
| 8,416,217 B1 * | 4/2013 | Eriksson | G06F 1/1616 178/18.09 |
| 2003/0234768 A1 | 12/2003 | Rekimoto et al. | |
| 2004/0263482 A1 * | 12/2004 | Goertz | G06F 3/0421 345/173 |
| 2006/0026536 A1 | 2/2006 | Hotelling et al. | |
| 2006/0132456 A1 | 6/2006 | Anson | |
| 2006/0197750 A1 * | 9/2006 | Kerr | G06F 1/1626 345/173 |
| 2007/0188518 A1 * | 8/2007 | Vale | G06F 3/04883 345/619 |
| 2007/0291008 A1 | 12/2007 | Wigdor et al. | |
| 2008/0088602 A1 | 4/2008 | Hotelling | |
| 2008/0150903 A1 | 6/2008 | Chuang | |
| 2008/0207274 A1 * | 8/2008 | Kim | H04M 1/72544 455/566 |
| 2008/0225013 A1 | 9/2008 | Muylkens et al. | |
| 2009/0256809 A1 | 10/2009 | Minor | |
| 2009/0315834 A1 * | 12/2009 | Nurmi | G06F 3/041 345/173 |
| 2010/0031202 A1 * | 2/2010 | Morris | G06F 3/04883 715/863 |
| 2010/0031203 A1 * | 2/2010 | Morris | G06F 3/04883 715/863 |
| 2010/0053151 A1 * | 3/2010 | Marti | G06F 3/011 345/419 |
| 2016/0162098 A1 * | 6/2016 | Kim | G06F 3/04845 345/174 |

FOREIGN PATENT DOCUMENTS

| | | |
|---|---|---|
| CN | 101198925 | 6/2008 |
| EP | 1 408 400 A2 | 4/2004 |
| EP | 2310930 A1 | 4/2011 |
| WO | 2006/020305 | 2/2006 |
| WO | 2006/096501 | 9/2006 |
| WO | 2009/153391 | 12/2009 |
| WO | 2009153391 A1 | 12/2009 |

OTHER PUBLICATIONS

Chinese Office Action dated Mar. 2, 2015, in Chinese Patent Application No. 201010105307.X.
Article 94(3) Communication dated Nov. 11, 2014, in European Patent Application 10 151 475.0.
Chinese Office Action dated Jun. 5, 2013 in Chines Application No. 201010105307.X.
Extended European Search Report dated Apr. 22, 2010 in European Patent Application No. 10151475.0.

* cited by examiner

MOBILE TERMINAL HAVING DUAL TOUCH SCREEN AND METHOD OF CONTROLLING CONTENT THEREIN

CROSS REFERENCE TO RELATED APPLICATION

This is a Continuation Application of U.S. application Ser. No. 12/691,982 filed Jan. 22, 2010, which claims priority from and the benefit of Korean Application No. 10-2009-0005966, filed on Jan. 23, 2009. The entire disclosures of the prior applications are considered part of the disclosure of the accompanying Continuation Application, and are hereby incorporated by reference.

BACKGROUND OF THE INVENTION

Field of the Invention

Exemplary embodiments of the present invention relate generally to a terminal device having a touch screen capability of controlling content therein, and more particularly, to a method for controlling content according to a touch event detected in the terminal device.

Description of the Background

Touch screens are devices in which a display unit and an input unit are implemented as a single unit and can be deployed in various terminal devices such as a computer and a mobile terminal. A touch screen typically includes a display unit to which a touch sensor is attached. The touch screen may detect touch events applied using an input tool, such as a user finger or a stylus pen, by detecting touches or releasing touches from a touch sensor.

A terminal device including a touch screen may perform various functions selectively applied by a touch event that is detected by a touch screen. However, a typical touch screen includes only one side to receive a detection of the touch event. A terminal device including a touch screen is required to display a plurality of buttons at which functions may be selected.

Thus, a single display unit of the terminal device cannot be utilized effectively due to its limited area to accept greater functional capabilities. Consequently, manufacturers of terminal devices (e.g., mobile terminal device) are challenged to continually add greater and greater functional capabilities in smaller and smaller form factors.

SUMMARY OF THE INVENTION

These and other needs are addressed by the present invention, in which exemplary embodiments provide a terminal device having a dual touch screen and a method of controlling content in the terminal device.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a method of control content. The method includes receiving a touch event from a touch screen of a display unit comprising a first touch sensor and a second touch sensor formed at a front side and/or a rear side of the display unit, wherein a content is displayed. The method also includes detecting the touch event applied from the first touch sensor and/or the second touch sensor, and checking an area at which the touch event is detected and released, the area is mapped to the content. The method includes controlling the content according to the touch event.

Exemplary embodiments of the present invention disclose a terminal device having a touch screen capability of controlling content. The device includes a touch screen comprising a display unit to display a content. The device also includes a first touch sensor formed at one side of the display unit and a second touch sensor formed at the other side of the display unit. The touch screen is configured to detect a touch event via the first touch sensor and/or the second touch sensor. The device includes a control unit to check an area, mapped to a content, at which the touch event is detected and released from the first touch sensor and/or the second touch sensor, and to control the content according to the touch event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

An apparatus, method, and software for control content in a terminal device having a dual touch screen are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The term 'content' may refer to any object to be displayed on a display unit of a terminal device. For example, the content may be a menu icon to select a function that can be performed in a mobile terminal, a multi-media icon to reproduce moving picture or music data in a mobile terminal, an image displayed on a mobile terminal, a thumbnail to indicate an image stored in a mobile terminal, and a data name assigned to various data. The content may be displayed as an image or text.

Figure 1:
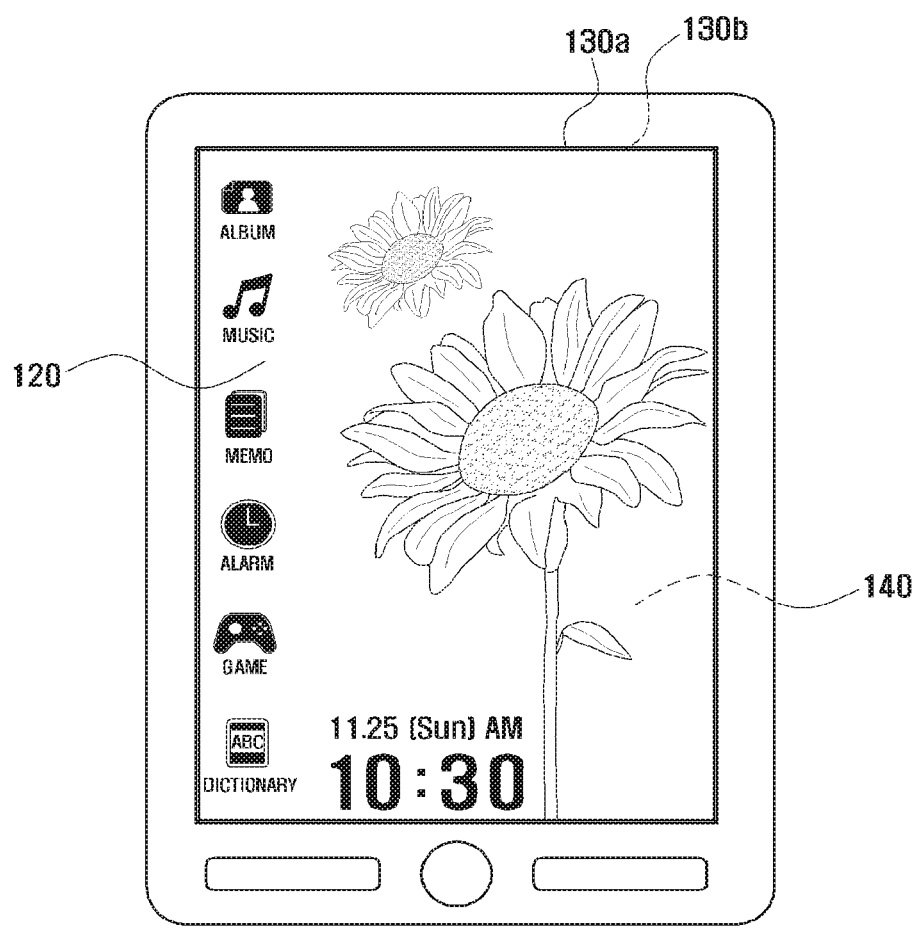
FIG. 1 is an exemplary view illustrating a mobile terminal including a dual touch screen, according to exemplary embodiments of the present invention.

FIG. 1 is an exemplary view illustrating a mobile terminal including a dual touch screen, according to exemplary embodiments of the present invention.

Referring to FIG. 1, a mobile terminal includes a dual touch screen. The dual touch screen includes two touch sensors 120 and 140 and a display unit 130. By way of configurations, each of the touch sensors 120 and 140 can be attached to both sides 130*a* and 130*b* of the display unit 130. For the illustration purpose, in each sides 130*a* and 130*b* of the display unit 130, one side facing to a user may be called a front side 130*a* and the opposite (e.g., other) side facing to opposite side of the user may be called a rear side 130*b*. A touch sensor configured to the front side 130*a* may be called a front touch sensor 120 and a touch sensor attached to the rear side 130*b* is called a rear touch sensor 140. A control unit of a mobile terminal may control content displayed on the display unit 130 according to a detected touch event from the two touch sensors 130 and 140.

Figure 2A:
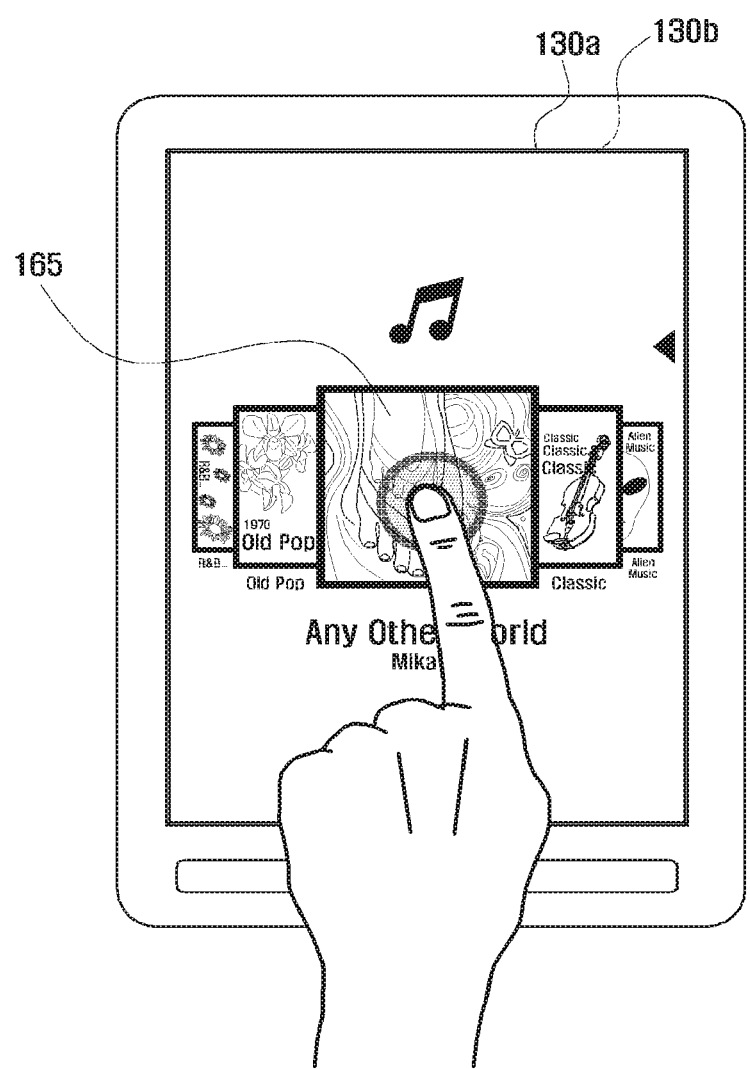
FIG. 2A and FIG. 2B are exemplary views of a screen to control content in response to a touch event detected from a dual touch screen, according to exemplary embodiments of the present invention.
Figure 2B:
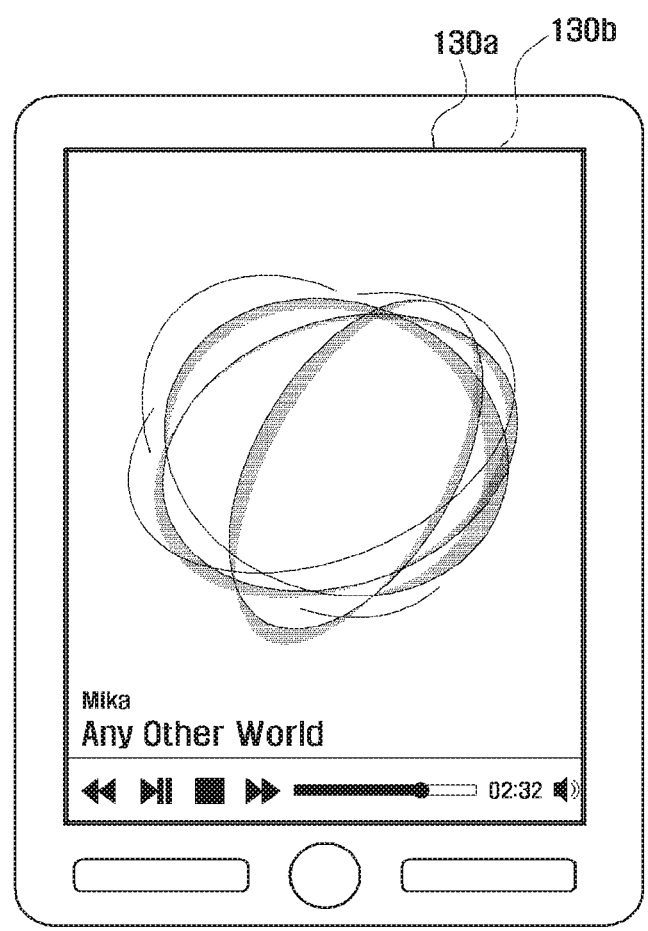

A method of controlling content displayed on the display unit with respect to detected touch event from the touch sensors 120 and 140 will be described with reference to FIG. 2A, FIG. 2B, FIG. 3A and FIG. 3B as exemplary views of a screen. FIGS. 2A and 2B are exemplary views of a screen to control content in response to a touch event that is detected from a dual touch screen according to exemplary embodiments of the present invention.

Referring to FIG. 2A and FIG. 2B, the display unit 130 may display a screen in which a function related to a content 165 may be performed with respect to a touch event that is detected from the front side 130*a*. For example, the display unit 130 of the mobile terminal can display at least one content 165 to reproduce music data service. The content 165 may be an album image, a singer image, or a file name of a music file that can be displayed on the display unit such that music data service can be selected. A user, as illustrated in FIG. 2A, may touch the front side 130*a* of the display unit 130 with his/her finger and may release the finger therefrom. The display unit 130, as illustrated in FIG. 2B, may display a screen in which music data can be reproduced, the music data corresponding to the content 165 that can be mapped to an area at which the finger touches and is released.

Figure 3A:
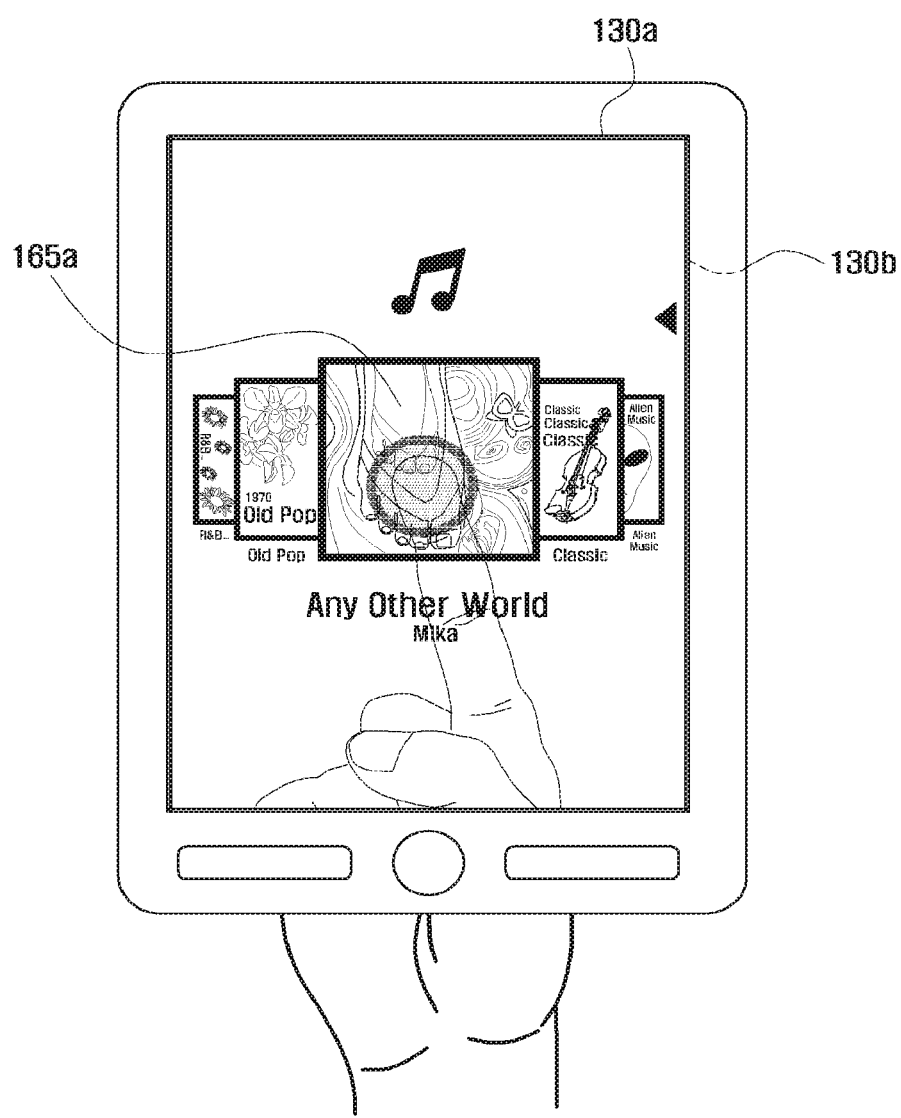
FIG. 3A and FIG. 3B are exemplary views illustrating a screen to control content by touch event that is detected from one side of a dual touch screen, according to exemplary embodiments of the present invention.
Figure 3B:
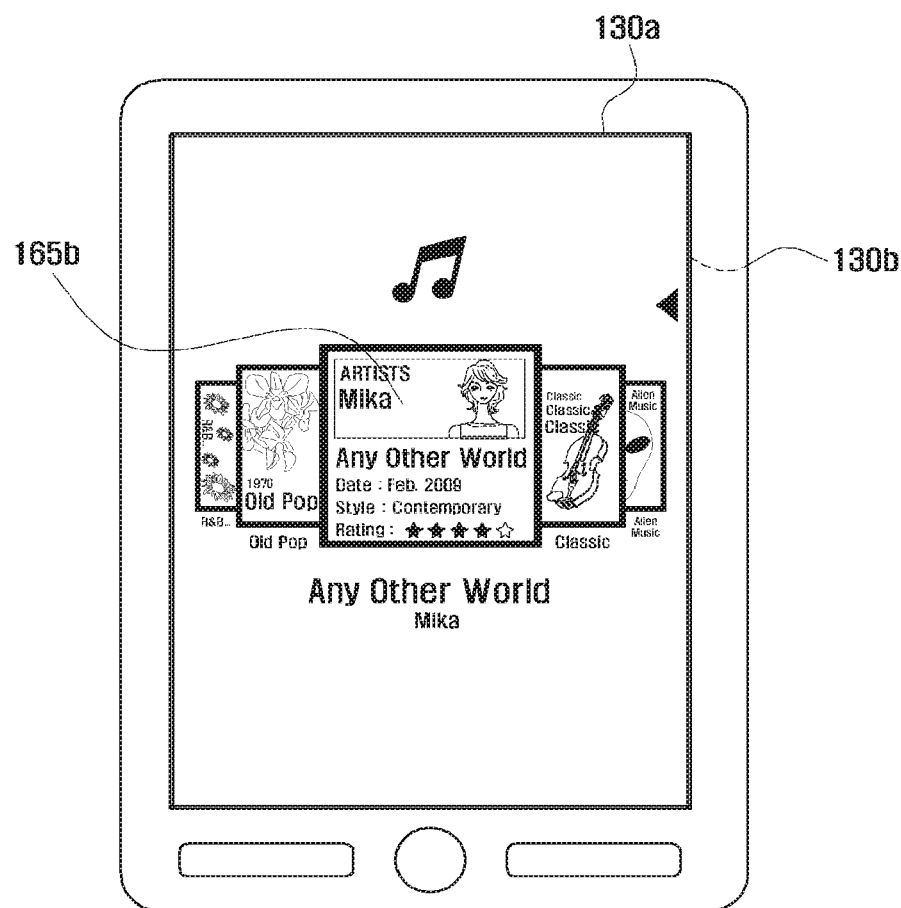

FIG. 3A and FIG. 3B are exemplary views illustrating a screen to control content by touch event that is detected from one side of a dual touch screen, according to another exemplary embodiment of the present invention.

Referring to FIGS. 3A and 3B, the display unit 130 may display detailed information 165*b* of the content 165*a* according to a touch event detected from the rear side 130*b* of the display unit 130. In some examples, the display unit 130 of the mobile terminal may display at least one content 165*a* to reproduce music data. A user, as illustrated in FIG. 3A, touches the rear side 130*b* with a finger and releases the finger therefrom. Then, the display unit 130, as illustrated in FIG. 3B, can display the detailed information 165*b* of the content 165*a* mapped to the area at which the finger touches and is released. The user may touch the front side 130*a* of the display unit 130 to which the detailed information 165*b* is displayed and releases a finger therefrom. The display unit 130 can display a screen in which music data corresponding to the content 165*a* is reproduced that can be mapped to an area at which the finger is touched and released. In this case, the detailed information 165*b* may include whole information on the music data such as a singer, genre, running time, and the like.

It is observed that a case where a touch event may be detected by one side of the display unit 130 is described. The content 165 configured to reproduce music data is described as an example of content 165, but the content 165 may not limited thereto. In some examples, the content 165 may be a thumbnail, and a menu icon. For example, in a case when the content 165 is displayed by a thumbnail, when a user touches the front side 130*a* of the display unit 130 with a finger and releases the finger from the front side 130*a*, the display unit 130 may enlarge an image to display the image corresponding to the thumbnail mapped to the area at which the finger is touched and released. When a user touches the rear side 130*b* of the display unit 130 with an input tool and releases the input tool from the rear side 130*b*, the display unit 130 may display detailed information of the image corresponding to the thumbnail that is mapped to the area at which the input tool is touched and released. In this example, the detailed information may include, for example, a size, a type, and a creation date of the image.

Next, a method of controlling the content 165 when touch events are detected by both sides of the display unit will be described with reference to FIG. 4A, FIG. 4B, FIG. 4C, FIG. 5A, FIG. 5B, FIG. 5C, FIG. 5D, FIG. 6A, FIG. 6B, FIG. 7A, FIG. 7B and FIG. 7C.

Figure 4A:
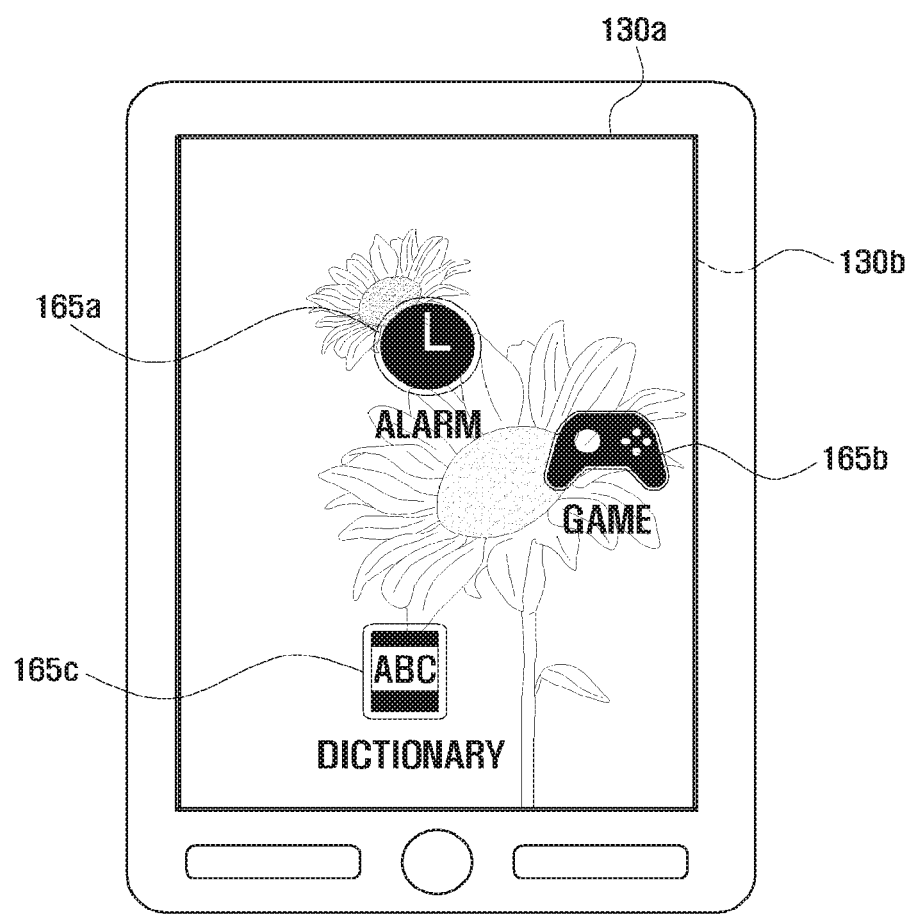
FIG. 4A, FIG. 4B and FIG. 4C are exemplary views illustrating a screen to change a position of content by touch events that are detected from both sides of a dual touch screen, according to exemplary embodiments of the present invention.
Figure 4B:
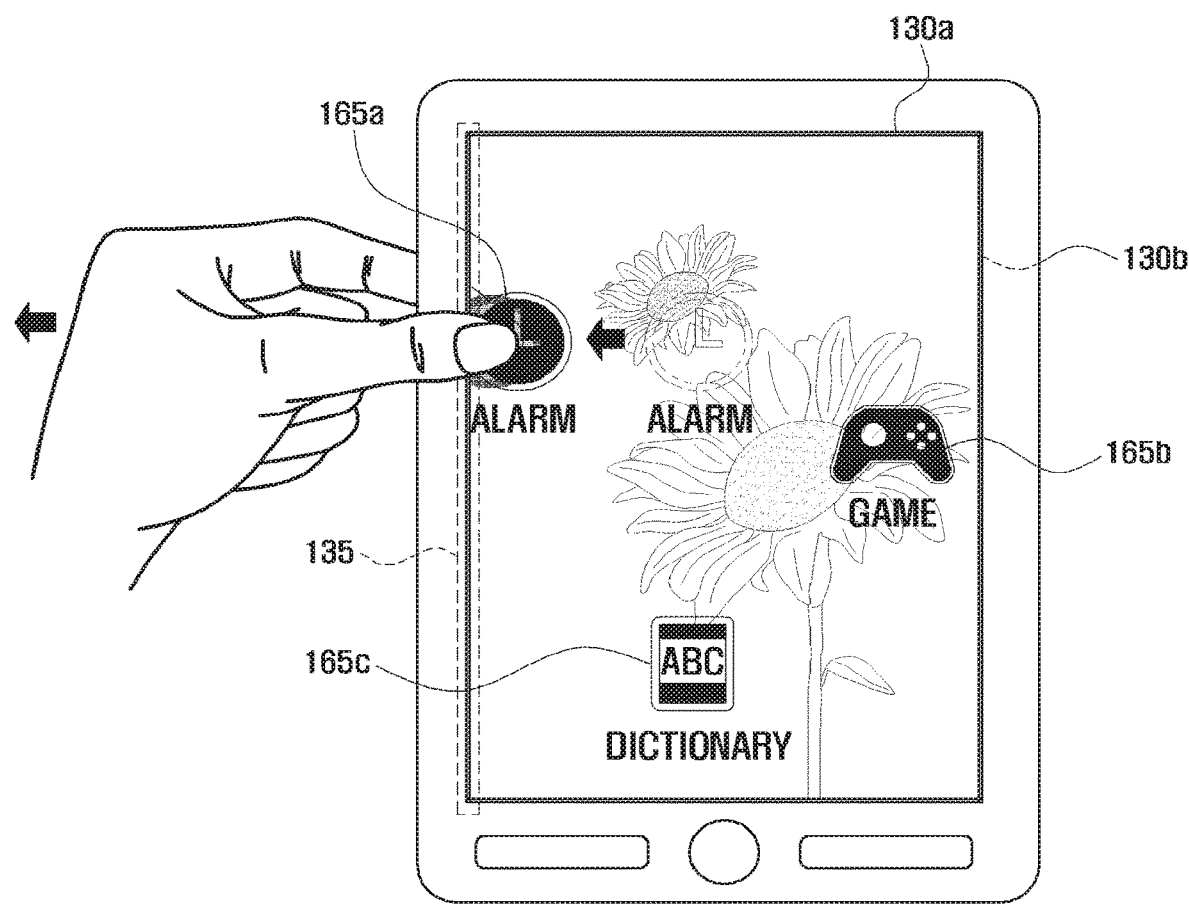
Figure 4C:
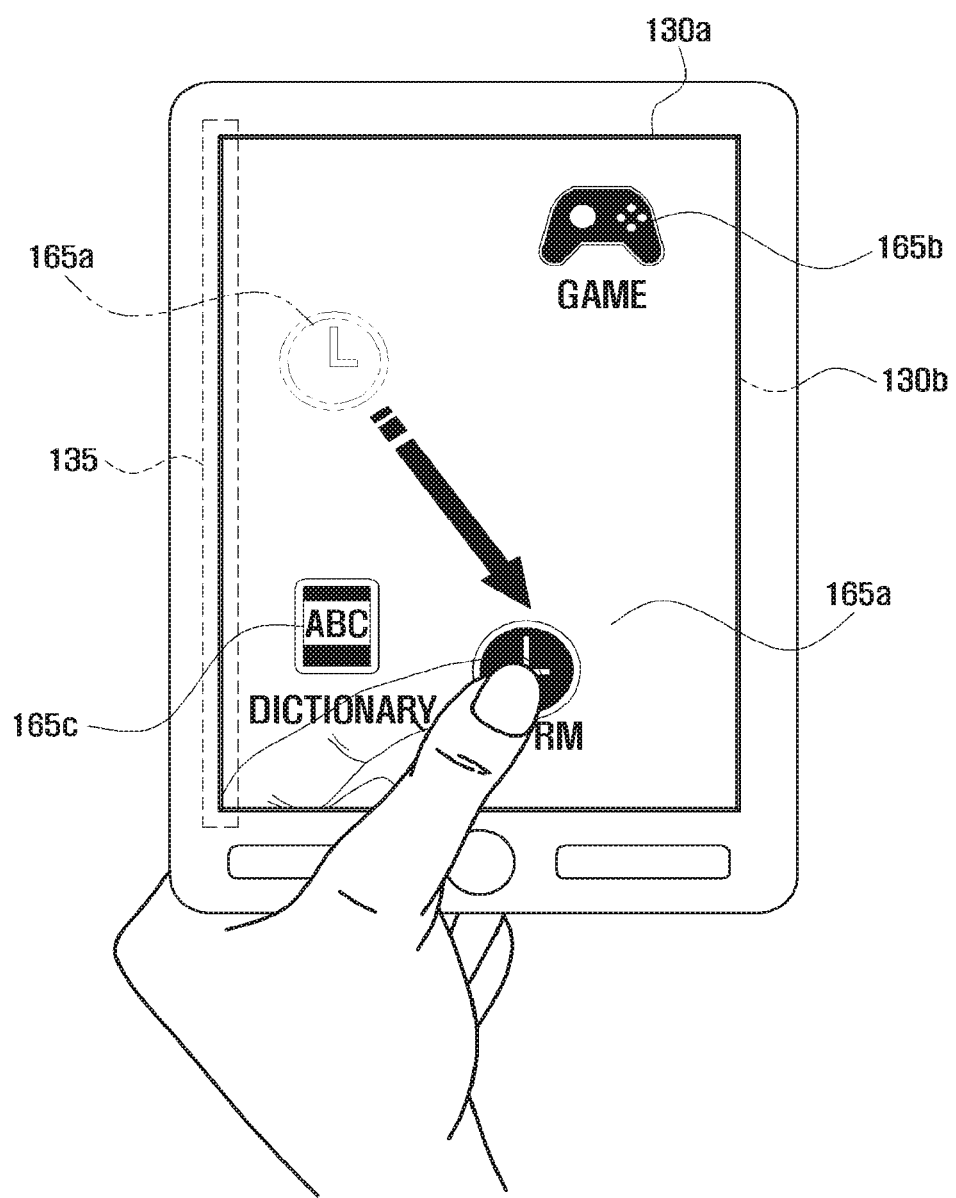

FIG. 4A, FIG. 4B and FIG. 4C are exemplary views illustrating a screen to change a position of content by touch events that are detected from both sides of a dual touch screen, according to exemplary embodiments of the present invention.

Referring to FIG. 4A, FIG. 4B and FIG. 4C, the display unit 130 may display a screen in which the content 165 can be deleted or moved according to touch events that can be detected by the front side 130a and the rear side 130b of the display unit 130. For the illustration purpose, it is assumed that the content 165 can be a menu icon to select a menu.

The display unit 130, as illustrated in FIG. 4A, can display a menu content, for example, an alarm content 165a, a game content 165b, and a dictionary content 165c. As illustrated in FIG. 4B, a user touches an area to which the alarm content 165a can be displayed with two fingers. As such, a user can touch the front side 130a of the display unit 130 to which the alarm content 165a is displayed and the rear side 130b matched (e.g., corresponding) to the front side 130a with two fingers. A user can move the two fingers toward at a border line 135 of the display unit 130. In this way, the display unit 130 can display a screen to which the alarm content 165a can move toward at the border line 135 of the display unit 130 according to the movements of the fingers. When the user moves the two fingers contacting (e.g., holding) the alarm content 165a to a point out of the border line 135 of the display unit 130, the display unit 130 may delete the alarm content 165a which previously displayed to an area to which the fingers had been touched.

As illustrated in FIG. 4C, the display unit 130 may move the content 165a along the moving direction of the fingers contacting the front side 130a and the rear side 130b of the display unit 130. By way of example, a user may touch the alarm content 165a with two fingers. The user, as illustrated in FIG. 4C, can move the two fingers inward from the border line 135 of the display unit 130. The alarm content 165a of the display unit 130 can be moved inward from the border line of the display unit 130 according to the movement of the fingers.

FIG. 5A, FIG. 5B, FIG. 5C and FIG. 5D are exemplary views illustrating a screen to zoom content by touch events that are detected from both sides of a dual touch screen, according to an exemplary embodiment of the present invention.

Figure 5A:
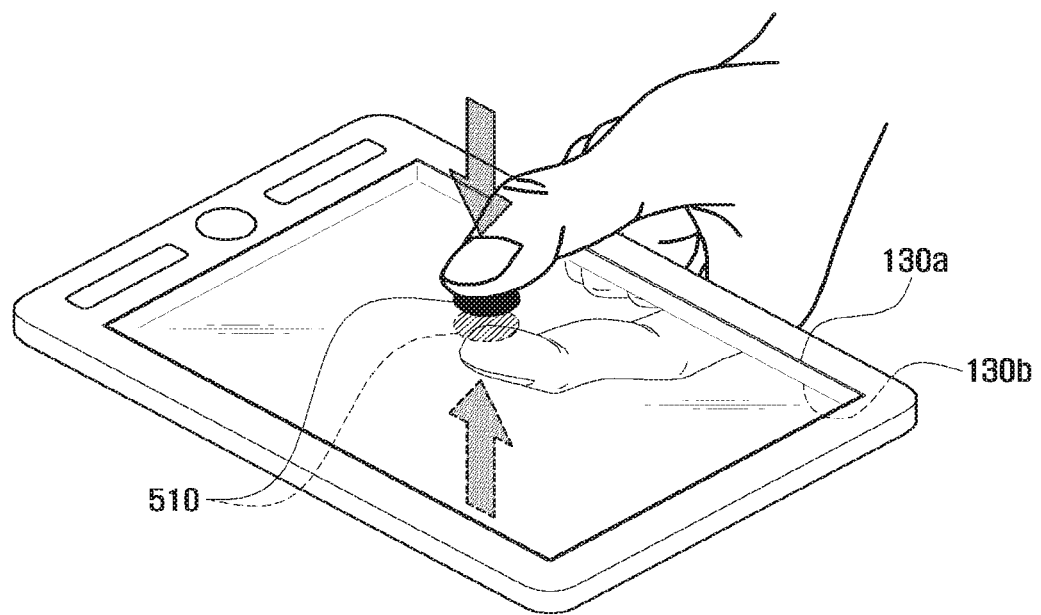
FIG. 5A, FIG. 5B, FIG. 5C and FIG. 5D are exemplary views illustrating a screen to zoom content by touch events that are detected from both sides of a dual touch screen, according to exemplary embodiments of the present invention.

Referring to FIG. 5A, the display unit 130 may display a screen to which the content 165 can be zoomed in or out according to touch events that are detected from the front side 130a and the rear side 130b of the display unit 130. In some examples, the user can touch two fingers to the front side 130a and the rear side 130b of the display unit 130 in order to zoom in or out the content 165 displayed to the display unit 130. To better appreciate, the area at which the fingers touch the front side 130a and the rear side 130b of the display unit 130 can be displayed as a circle 510.

Figure 5B:
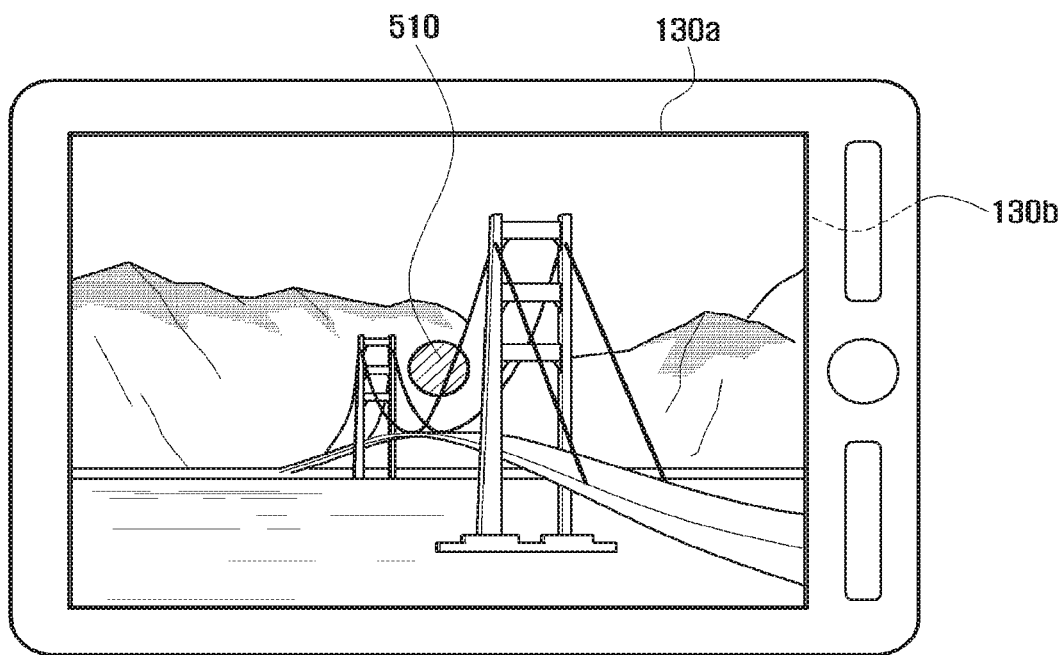
Figure 5C:
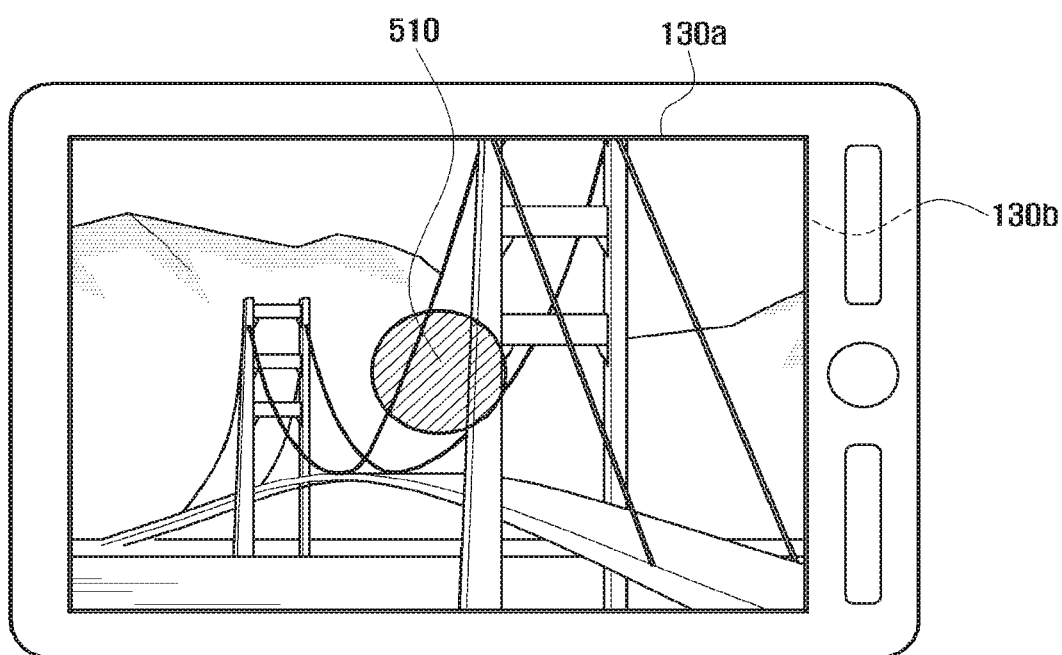

Referring to FIGS. 5B and 5C, the display unit 130, as illustrated in FIG. 5B, can display an image in full screen. In order to enlarge a specific part of the image, the user can touch simultaneously the front side 130a and the rear side 130b of the display unit 130 with two fingers. The user can press the fingers touching at the front side 130a and the rear side 130b of the display unit 130 in order to enlarge the image. The display unit 130, as illustrated in FIG. 5C, can enlarge the image with respect to an area at which the two fingers touch and press the display as a reference point. In some examples, the size of the circle 510 may be indicated based on a degree of the pressure applied to the area by fingers which are touching and pressing the front side 130a and the rear side 130b of the display unit 130. As such, a large circle 510 may indicate a high pressure and a small circle 510 indicates a low pressure.

Figure 5D:
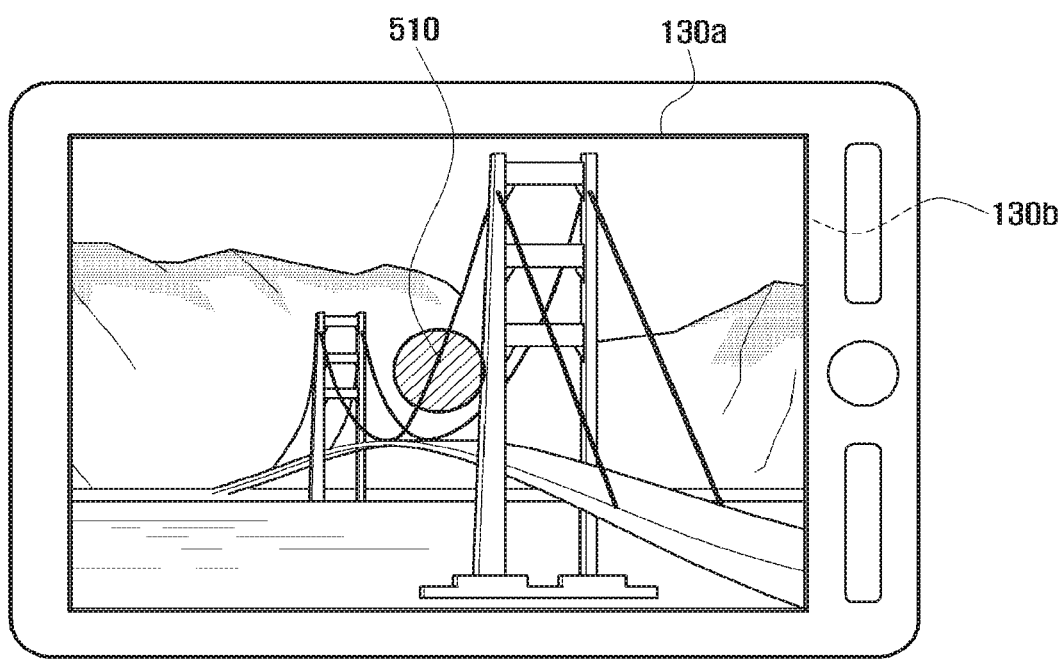

The user can touch the front side 130a and the rear side 130b of the display unit 130 with two fingers in order to reduce the enlarged image. In this example, the user may immediately release the two fingers from the front side 130a and rear side 130b or loosens the applied pressure of the fingers in order to reduce the image. In this way, as illustrated in FIG. 5D, the display unit 130 can reduce the image with respect to the area at which the two fingers touch as a reference point of reducing the image to display.

In this example, a size of the circle 510 can be described as a degree of pressure applied to the fingers by the user, but is not limited thereto. The size of the circle 510 may represent an area of user finger's touching the front side 130a and the rear side 130b of the display unit 130. In addition, the size of the circle 510 may represent time for which the fingers touch the front side 130a and the rear side 130b and are released therefrom.

Figure 6A:
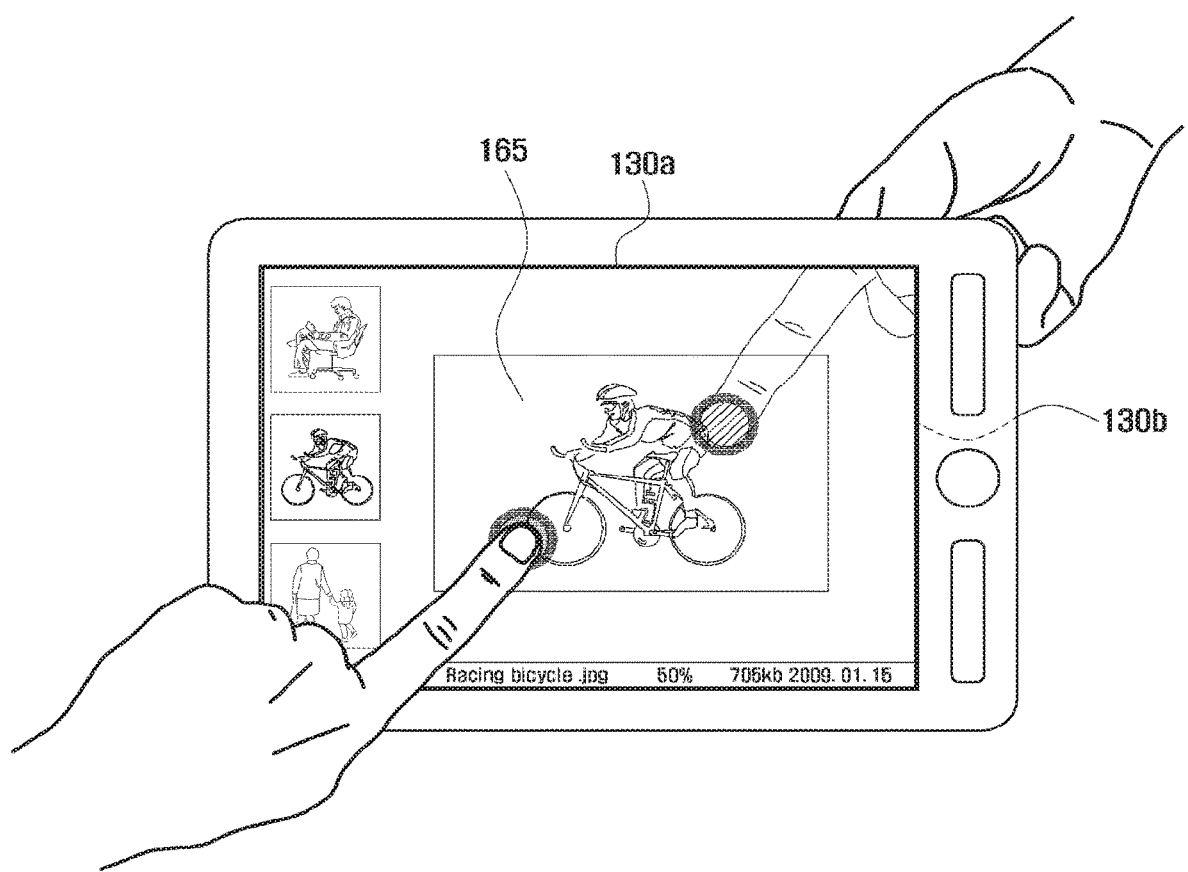
FIG. 6A and FIG. 6B are exemplary views illustrating a screen to rotate content by touch events that are detected from both sides of a dual touch screen, according to exemplary embodiments of the present invention.
Figure 6B:
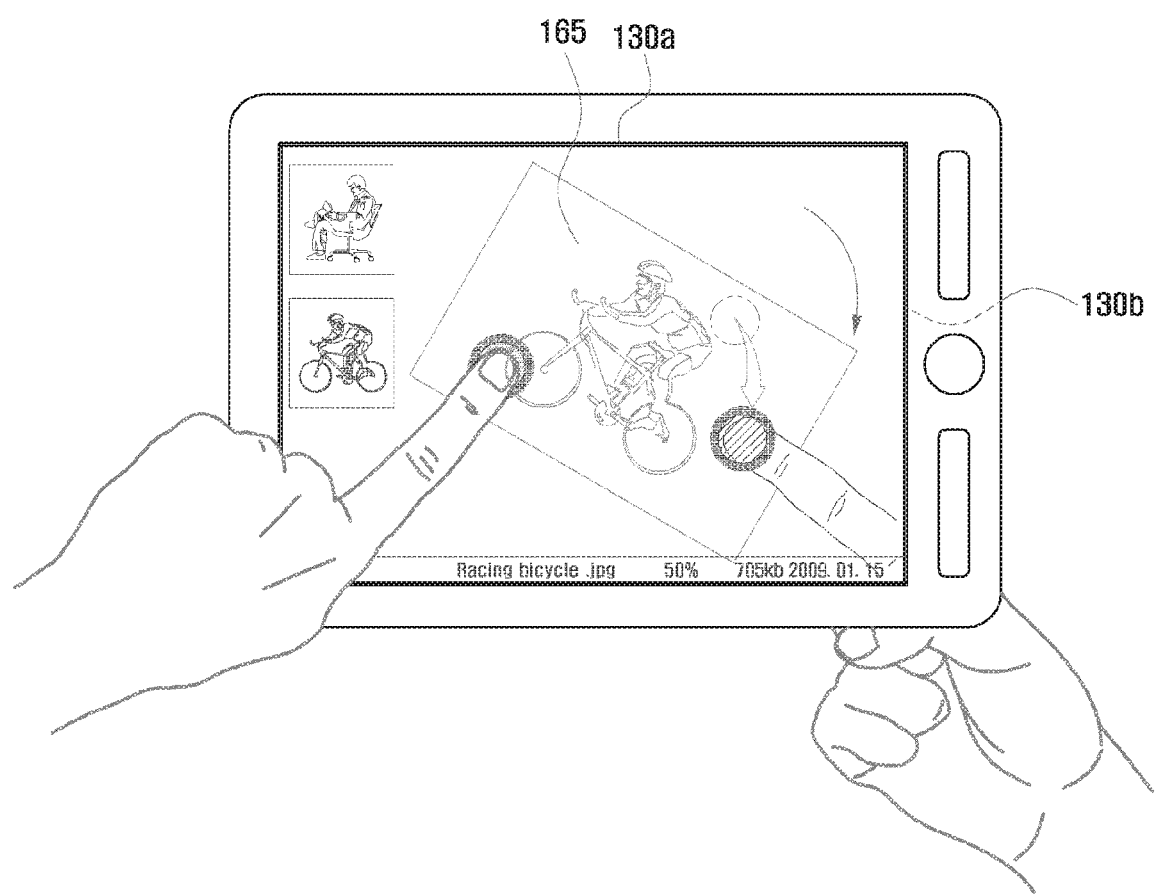

FIG. 6A and FIG. 6B are exemplary views illustrating a screen to rotate content by touch events that are detected from both sides of a dual touch screen, according to exemplary embodiments of the present invention.

Referring to FIGS. 6A and 6B, the display unit 130 may display the content 165 as an image. A user, as illustrated in FIG. 6A, can touch the front side 130a of the display unit 130 with one finger and the rear side 130b with another finger. In some examples, the user, as illustrated in FIG. 6B, can fix one finger and can turn the other finger based on the fixed finger. In responding to this turning action by fingers, the display unit 130 is able to rotate the content 165 with respect to an area to which a first finger touches a point of content 165 while a second finger touches the other point to turn the content 165 based on axis of the first finger. In FIG. 6B, the user may fix one finger by touching a point of the content 165 of the front side 130a and rotates the content with the other finger by rotating the other finger along the rear side 130b. It is noted that the turning mode is not limited thereto. Alternatively, the user may fix one finger touching the rear side 130b and may turn and/or rotate the other finger by touching the front side 130a. In some examples, the display unit 130 may rotate the content 165 with respect to an area to which the touch is detected by the rear side 130b of the display unit 130 along with the movement of the touch detected by the front side 130a.

Figure 7A:
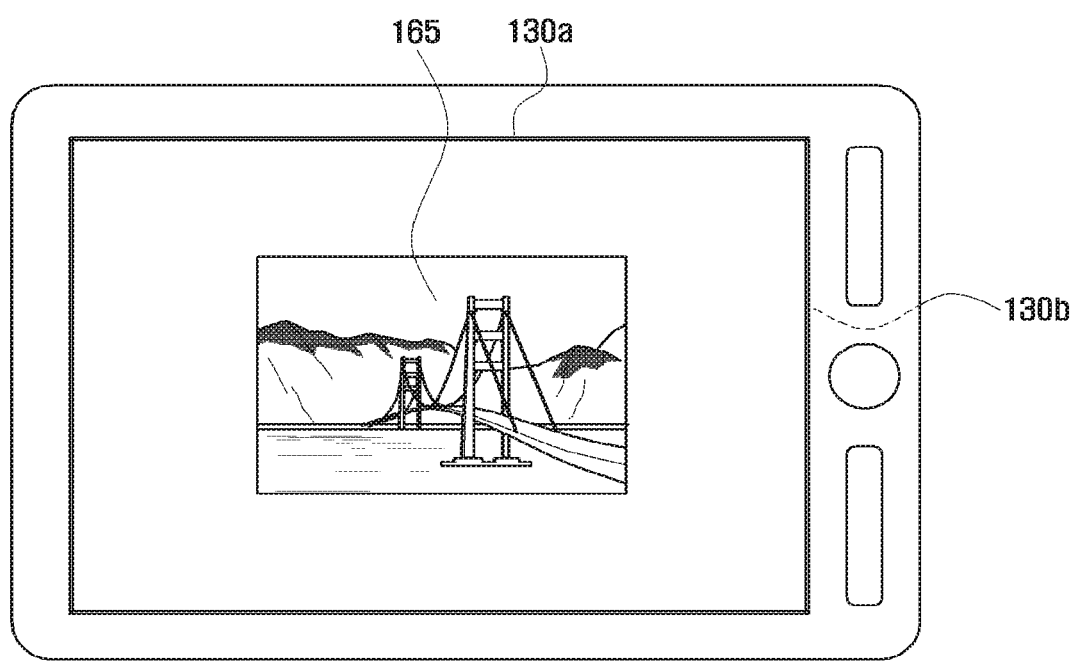
FIG. 7A, FIG. 7B and FIG. 7C are exemplary views illustrating a screen to change a size of content by touch events that are detected from both sides of a dual touch screen, according to exemplary embodiments of the present invention.
Figure 7B:
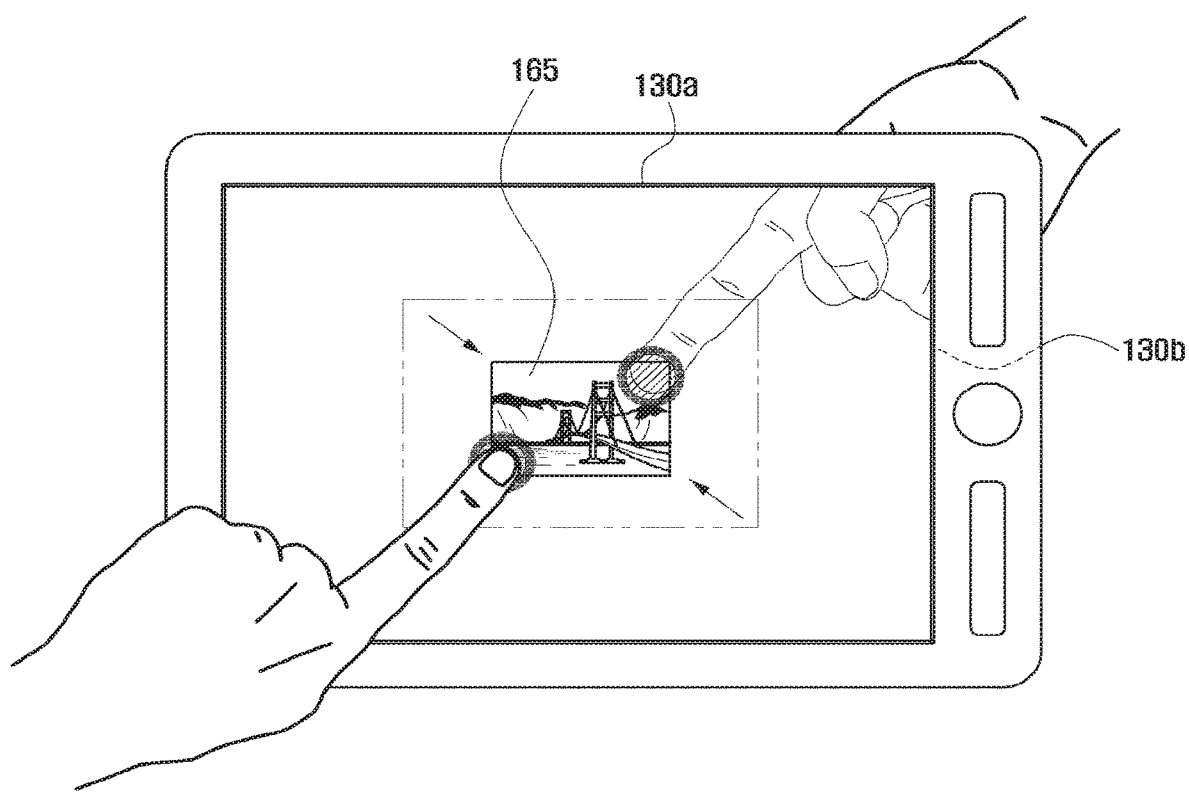
Figure 7C:
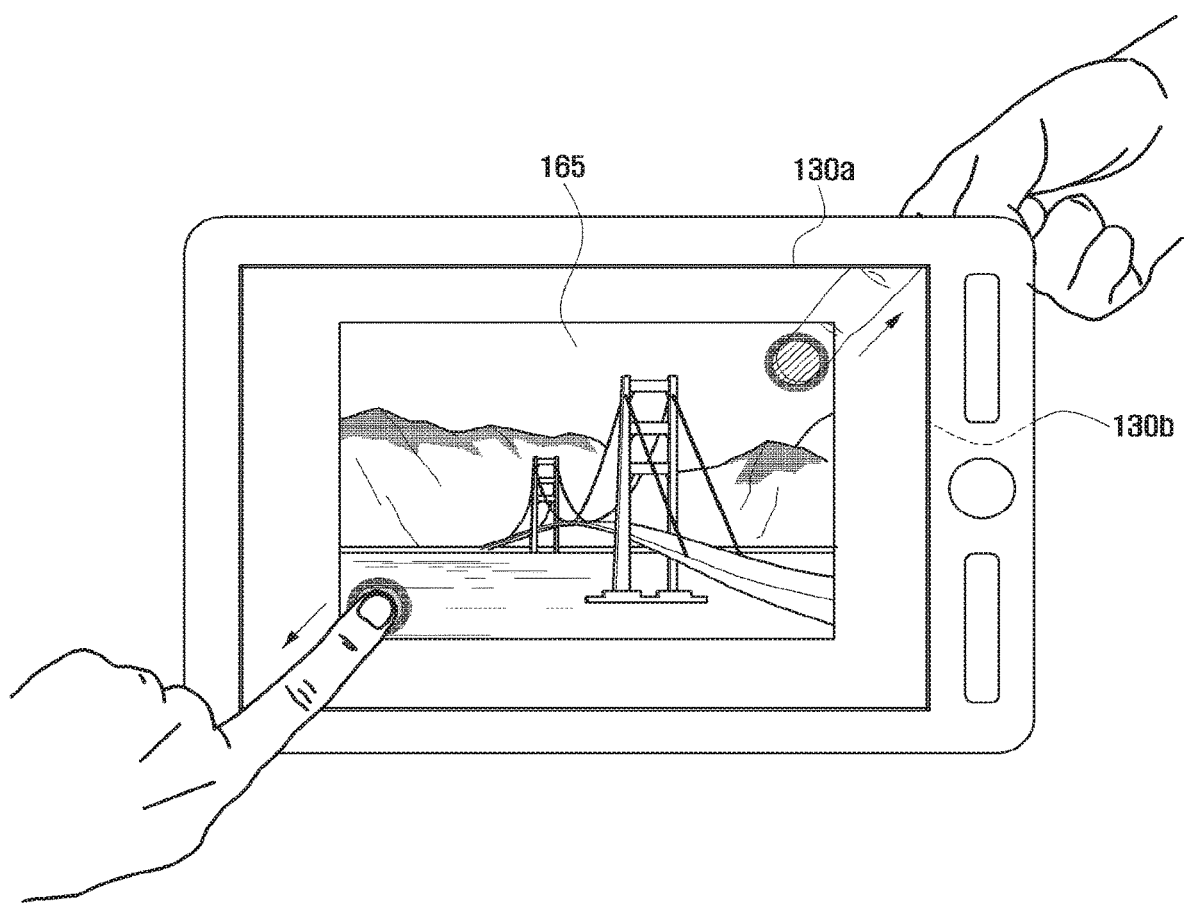

FIG. 7A, FIG. 7B and FIG. 7C are exemplary views illustrating a screen to change a size of content by touch events that are detected from both sides of a dual touch screen, according to exemplary embodiments of the present invention.

Referring to FIG. 7A, FIG. 7B and FIG. 7C, when the content 165 is an image, the display unit 130 can display the content 165 as illustrated in FIG. 7A. A user can touch the front side 130a with one finger and the rear side 130b with another finger. The user can move the content 165 the two fingers. In addition, the display unit 130 may enlarge or reduce the content 165 according to a distance change applied by the two fingers associated with enlarging and/or reducing the content 165.

For example, when a distance between the two fingers is decreased as illustrated in FIG. 7B, the display unit 130 can reduce the content 165. As illustrated in FIG. 7C, when the distance between the two fingers is increased, the display unit 130 can enlarge the content 165.

Various embodiments of controlling content according to a touch event that is detected by a mobile terminal having a dual touch screen have been described.

Figure 8:
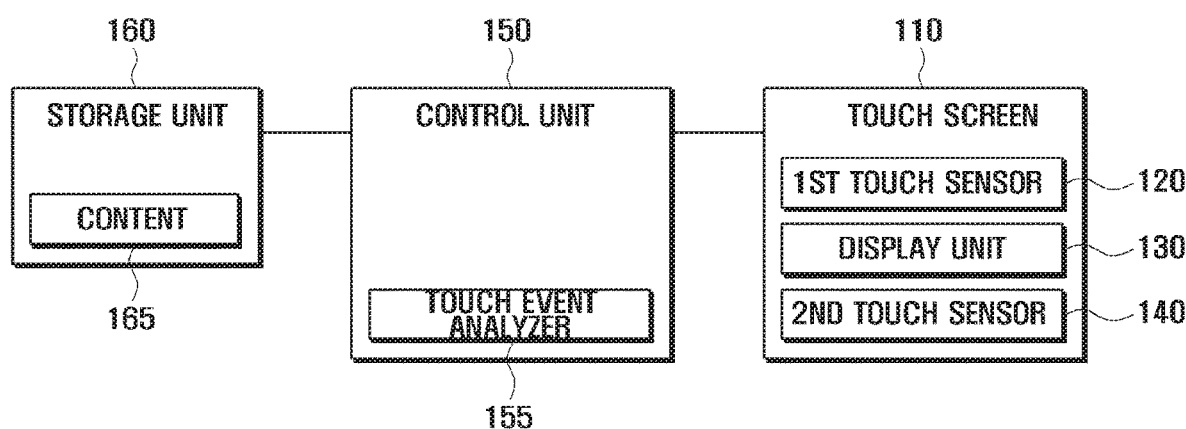
FIG. 8 is a schematic block diagram illustrating an exemplary computing system of a mobile terminal that can be used to implement various embodiments of the present invention.

FIG. 8 is a schematic block diagram illustrating an exemplary computing system of a mobile terminal that can be used to implement various embodiments of the present invention.

Referring to FIG. 8, the mobile terminal can include, by way of example, a touch screen 110 having a first touch sensor 120, a display unit 130, and a second touch sensor 140, a control unit 150, and a storage unit 160.

The touch screen 110 may include the first touch sensor 120, the display unit 130 having two sides for display, and the second touch sensor 140. In some examples, a side of the display unit 130 facing to a user may be referred to a front side and a side facing opposite to the front side may be referred to a rear side. For example, according to a configuration or by way of design choice, the first touch sensor 120 may be attached to the front side of the display unit 130 and the second touch sensor 140 may be attached to the rear side of the display unit 130. The first and second touch sensors 120 and 140 may be a capacitive touch sensor to detect a touch event with based on detecting proximity or position based on capacitive coupling effects, a resistive touch sensor to detect a touch event based on detecting change of resistance, and a piezoelectric touch sensor to detect a touch event based on detecting change of pressure.

The display unit 130 can display data related with respect to overall status and an operation of the mobile terminal. The display unit 130 may display various contents under the control of the control unit 150. For example, the display unit 130 may change and display the content 165 according to a touch event detected from two touch sensors under the control of the control unit 150.

The touch screen 110, including display unit 130, may be coupled to the touch sensor 120. Examples of the display unit 130 include, for example, a liquid crystal display, a flexible display, or active matrix display, for displaying information to the user. In some cases, the touch screen 110 may be an input device, such as a keyboard, including alphanumeric and other keys. The input device may be coupled to the bus and may communicate information and command selections to the processor. The input device may include various types of sensors (e.g., touch sensors 120 and 140) and may include a plurality of touch zones in the touch screen 110 for detecting user input. The input device may further include a cursor control, such as a mouse, a trackball, or cursor direction keys, for communicating direction information and command selections to the processor and for controlling cursor movement on the display unit 130.

In some examples, in response to detection of display of a content 165 related to specific data to the display unit 130, it can be determined that a touch event is applied in an area to which the content 165 is displayed. When a touch event is detected from the front side of the display unit 130, the display unit 130 may display data corresponding to the content 165 under the control of the control unit 150. In some examples, the display unit 130 may display a screen in which a function corresponding to data is performed under the control of the control unit 150. In response to a touch event that is detected by the rear side of the display unit 130, the display unit 130 may display detailed information on the content 165 under the control of the control unit 150.

For the purpose of illustration, it is assumed that touch events can be detected from areas of the respective front and rear side of the display unit 130 matched to each other. In some examples, the display unit 130 may delete the content 165 according to a moving direction of the touch event or move the content 165 location according to the moving direction of the touch event under the control of the control unit 150. The display unit 130 may display the content 165 that can be zoomed in or out with respect to an area where the touch event is detected under the control of the control unit 150.

Moreover, the display unit 130 may enlarge or reduce the size of the content 165 according to a distance change applied between by two fingers, one finger moves a first contact (e.g., touch event) detected by the front side of the display unit 130 and the other finger moves a second contact (e.g., touch event) detected by the rear side of the display unit 130.

The first and second touch sensors 120 and 140 may detect a touch event in terms of time and degree of the touch event in which an input tool, such as a user finger, contacts a surface of the display unit 130 and is released therefrom. The first touch sensor 120 and second touch sensors 140 may check a coordinated touch event (e.g., touch event, move event, rotate event, hold event with fingers or the combination of the touch, move, hold and rotate event) corresponding to an area to which the touch event is detected and transmit the coordinated touch event to the control unit 150. The first and second touch sensors 120 and 140 may be attached to the front side and rear side of the display unit 130, respectively. In this example, the first touch sensor 120 attached to the front side of the display unit 130 may be referred to a front touch sensor and the second touch sensor 140 attached to the rear side of the display unit 130 may be referred to a rear touch sensor. When a user touches the front side of the display unit 130 with a finger and releases the finger therefrom, the front touch sensor 120 may detect a touch event. When a user touches the rear side of the display unit 130 with a finger and releases the finger therefrom, the rear touch sensor 140 may detect a touch event.

When a user touches the front side and the rear side of the display unit 130 at the same time and/or in time sequence with fingers touches and releases the fingers therefrom, the front and rear touch sensors 120 and 140 may detect touch events. For example, the touch event may be a contact, a release, and a movement and a release of the contact and/or a combination of the contact, release, and movement associated with a coordinated touch event that can be detected by one of the front touch sensor 120 and the rear touch sensor 140.

The control unit 150 may control overall status and operation of all components of the mobile terminal. The control unit 150 may include a touch event analyzer 155 configured to analyze a touch event detected from the touch screen 110.

The touch event analyzer 155 can analyze the touch event applied to an area at which the contact or the release can be detected and determined by processing of the control unit 150, which can be transmitted from the touch screen 110. In some examples, the touch event analyzer 155 coupled to the control unit 150 may determine a location of detection whether the touch event occurs on a front side, on a rear side, or both sides of the display unit 130 by detecting the coordinated event information transmitted from the touch screen 110 after processing by the control unit 150. The touch event analyzer 155 may determine whether a contact detected on the surface of the touch screen 110 can be moved using the coordinated event information transmitted from the touch screen 110. The touch event analyzer 155 may determine a size of an area where a contact is detected using the coordinated event information transmitted from the touch screen 110. The touch event analyzer 155 may calculate a distance detected between a first contact and a second contact using the coordinated event transmitted from the touch screen 110.

The control unit 150 may control the content 165 displayed on the display unit 130 according to a touch event that can be determined by the touch event analyzer 155. For example, when a touch event occurs on the front side 130*a* of the display unit 130, the control unit 150 may perform a function related to content 165 mapped to an area where the touch event occurs. As such, when the content 165 mapped to the area where the touch event occurs is moving picture data, the control unit 150 may reproduce the moving picture data.

When a touch event is detected on the rear side of the display unit 130 from the touch screen 110, the control unit 150 may display detailed information of the content 165 mapped to the area where the touch event occurs. For example, when the content 165 mapped to the area where the touch event occurs is music data, the control unit 150 may display information of a singer, music genre, a running time, and a creation date associated with the detailed information of the music data.

When touch events are detected on a front side and a rear side of the display unit 130 from the touch screen 110, the control unit 150 may control the content 165 according to the applied touch events. The control unit 150 may control the content 165 according to whether the first area and second area corresponding to the front side and rear side of the display unit 130 where the touch events can be detected that are matched to each other. The area where the first contact is detected by the front side of the display unit 130 may be referred to a first area and the area where the second contact is detected by the rear side of the display unit 130 may be referred to a second area.

According to exemplary embodiments, touch events can be detected by the front side and rear side of the display unit 130, and the detection point are matched that will be described.

When a first area and a second area where contacts are detected at the front and rear sides of the display unit 130 that are matched to each other, and the contacts are moved to the outside of the border line 135 of the display unit 130 and the contacts are released, the control unit 150 may delete the content 165 displayed on the display unit 130. Alternately, when the first area and the second area where contacts are detected on the front side and rear side of the display unit 130 that are matched to each other, and the contacts are moved within the border line 135 of the display unit 130 and the contacts are released, the control unit 150 may control the display unit 130 to move and display the content 165 at a position according to the movement made within the border line 135.

When the first area and the second area where contacts are detected on the front side and rear side of the display unit 130 that are matched to each other, and duration of detection time is longer than a preset time (e.g., time threshold), the control unit 150 may control the content 165 to zoom in at the display unit 130. When duration of time of the contacts are detected shorter than the preset time, the control unit 150 may control the content 165 to zoom out at the display unit 130.

Alternately, the control unit 150 may display the content 165 by zooming in or out according to a size of the first area and the second area where the contacts can be detected at the front side and rear side of the display unit 130. In other words, when the sizes of the first and second areas are larger than a preset size (e.g., predetermined size, or size by way of configuration of display unit 130), the control unit 150 may zoom in the content 165. When the sizes of the first area and the second area are smaller than the preset size, the control unit 150 may zoom out the content 165.

If areas of the front side and rear side of the display where the touch events are detected are not matched to each other, the control unit 150 may enlarge or reduce the size of the content 165 displayed on the display unit 130 according to the distance between the first contact detected on the front side of the display unit 130 and the second contact detected on the rear side of the display unit 130. By way of illustration, when the distance between the first contact and the second contact is larger (e.g., greater) than about 0 (zero), the control unit 150 may control the display unit 130 to enlarge the content 165. When the distance between the first and second contacts is approaching to about 0 (zero), the control unit 150 may control the display unit 130 to reduce the content 165. When one of the first and second contacts is fixed and the other is rotated based on the fixing contact, the control unit 150 may control the display unit 130 to rotate the content 165.

According to various exemplary embodiments of the invention, execution of the instructions contained in storage unit 160 may cause the processor to perform processes according to the instructions. The control unit 150 may include one or more processors in a multi-processing arrangement to execute the instructions contained in storage unit 160. Hard-wired circuitry may be used in place of, or in combination with, software instructions to implement one or more of the exemplary embodiments of the present invention. For example, reconfigurable hardware, such as Field Programmable Gate Arrays (FPGAs), can be used, and functionality and connection topology of the FPGA logic gates may be customized at run-time, typically by programming memory look up tables. Thus, exemplary embodiments of the present invention are not limited to any specific combination of hardware circuitry and/or software.

The terminal device may also include at least one communication interface unit (not shown). The communication interface unit may provide a two-way data communication coupling to a network link (not shown). The communication interface unit may send and receive electrical, electromagnetic, or optical signals that can carry digital data streams representing various types of information. Further, the communication interface unit may include peripheral interface devices, such as a Universal Serial Bus (USB) interface, or a PCMCIA (Personal Computer Memory Card International Association) interface.

The processor may execute transmitted code and/or may store the transmitted code in the storage unit 160, or in other non-volatile storage. In some cases, the terminal device may obtain application code in the form of a carrier wave.

A "computer-readable medium" may refer to any medium that provides instructions to the processor for execution. Such a medium may be implemented in various forms, including but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including the wires that comprise the bus. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other suitable magnetic medium, a compact disk read-only memory (CD-ROM), compact disc rewritable (CDRW), digital video disc (DVD), any other suitable optical medium, punch cards, optical mark sheets, any other suitable physical medium with patterns of holes or other optically recognizable indicia, a random-access memory (RAM), a programmable read-only memory (PROM), and erasable programmable read-only memory (EPROM), a FLASH-EPROM, any other memory chip or cartridge, and a carrier wave.

Various forms of computer-readable media may be involved in providing instructions to a processor for execution. For example, the instructions for carrying out at least part of the present invention may be implemented on a magnetic disk of a remote computer. The remote terminal device may load the instructions into the memory unit 150 and may send the instructions, for example, over a telephone line using a modem. A modem of a local system may receive the data on a telephone line and/or may be used an infrared transmitter to convert the data to an infrared signal and may transmit the infrared signal to the terminal device. The terminal device may receive information and instructions provided by the infrared signal. The bus may provide the information and instructions to the storage unit 160, from which a processor may retrieve and execute the instructions. The instructions received by memory unit 150 may optionally be stored either before or after execution by the control unit 150.

The storage unit 160 may store an application program in relation with functions performed in a mobile terminal and various data generated during the performance of the functions. The storage unit 160 may store content 165 to be displayed on the display unit 130.

A terminal device, as shown in FIG. 8, may include a bus (not shown) or other communication mechanisms for communicating data, and a control unit 150 including a processor (not shown) coupled to the bus for processing information. The terminal device may also include storage unit 160, which may be a random access memory (RAM) or a dynamic storage device coupled to the bus for storing information and instructions to be executed by the processor. The storage unit 160 may also be used for storing temporary variables or intermediate information during execution of instructions by the processor. The storage unit 160 may be a read only memory (ROM) or other static storage device coupled to the bus for storing static information and instructions for the processor. The storage unit 160 may include a series of applications to operate the terminal device. Examples of suitable applications comprises a menu icon to select a function, a multimedia icon to reproduce moving picture data and music data, an image, a thumbnail, and a data name set by data types.

Figure 9:
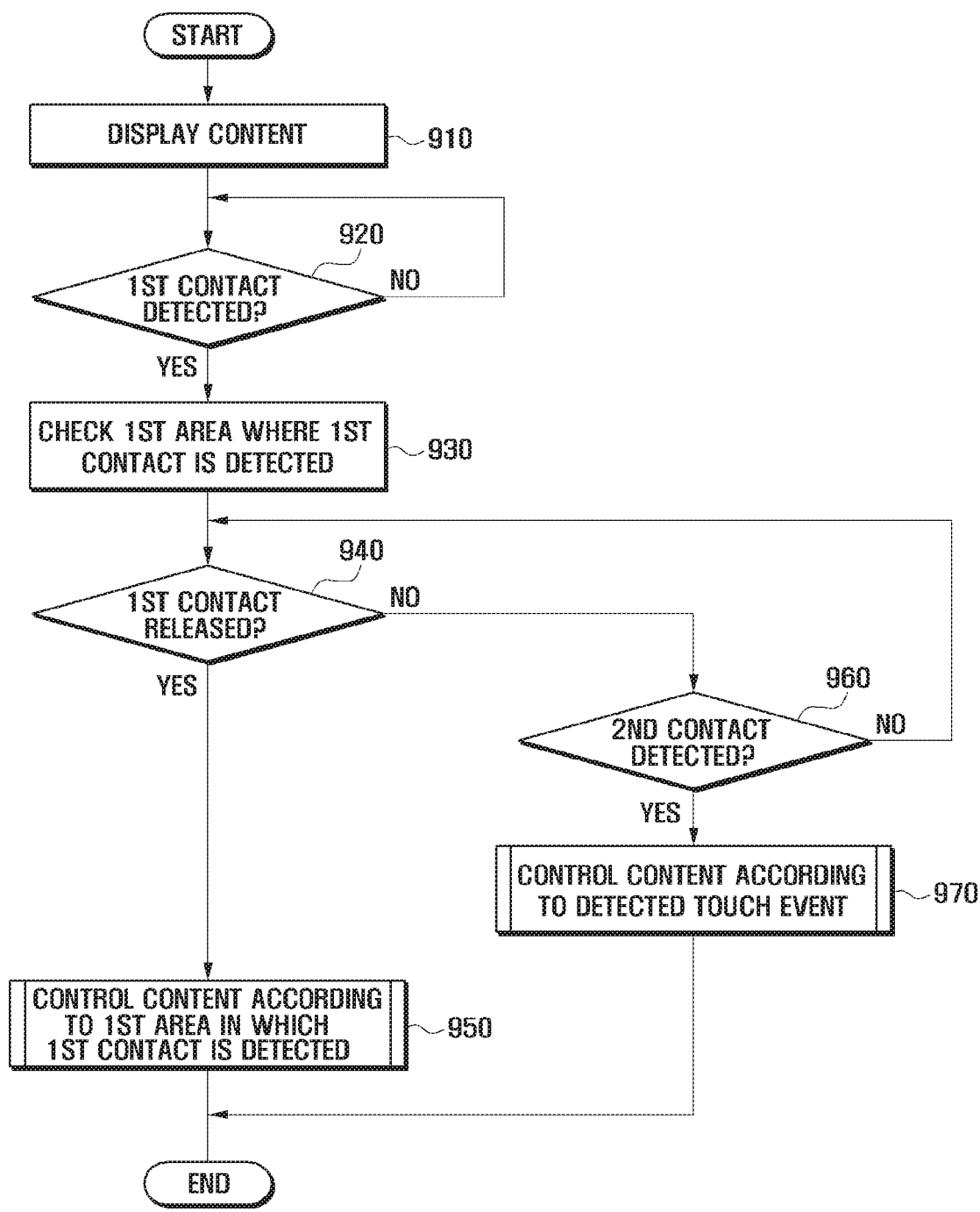
FIG. 9 is a flowchart of a process for illustrating a method of controlling content, according to exemplary embodiments of the present invention.
Figure 10:
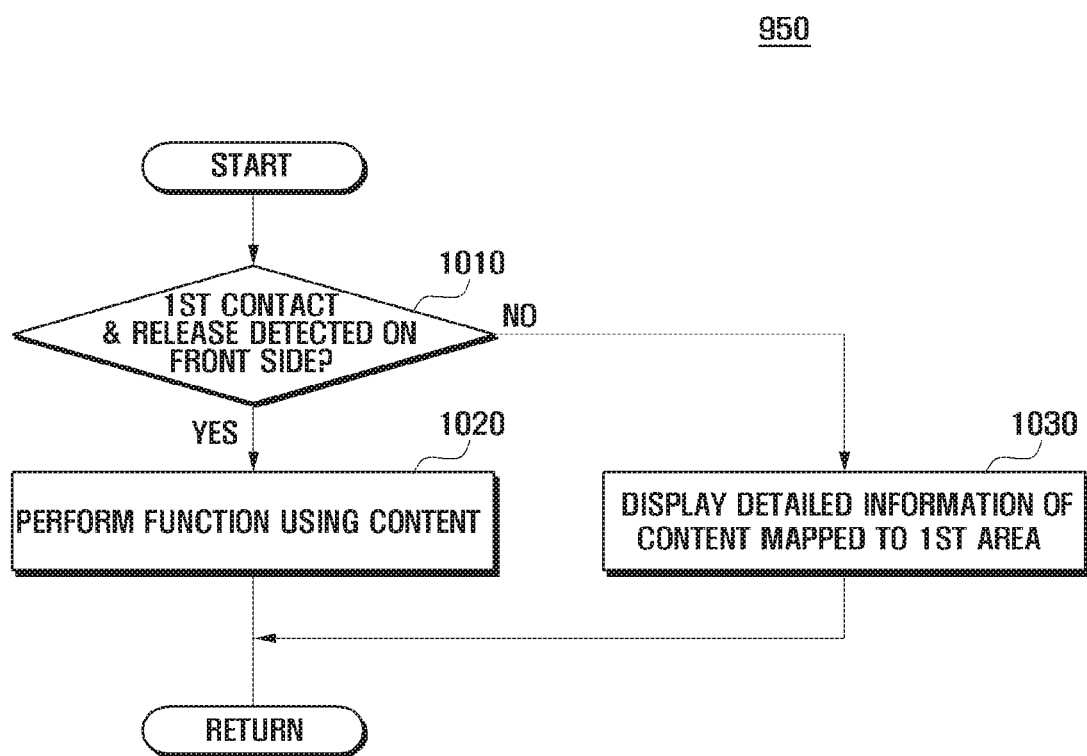
FIG. 10 is a flowchart of a process for illustrating a method of controlling content based on an area at which a touch event is detected, according to exemplary embodiments of the present invention.
Figure 11:
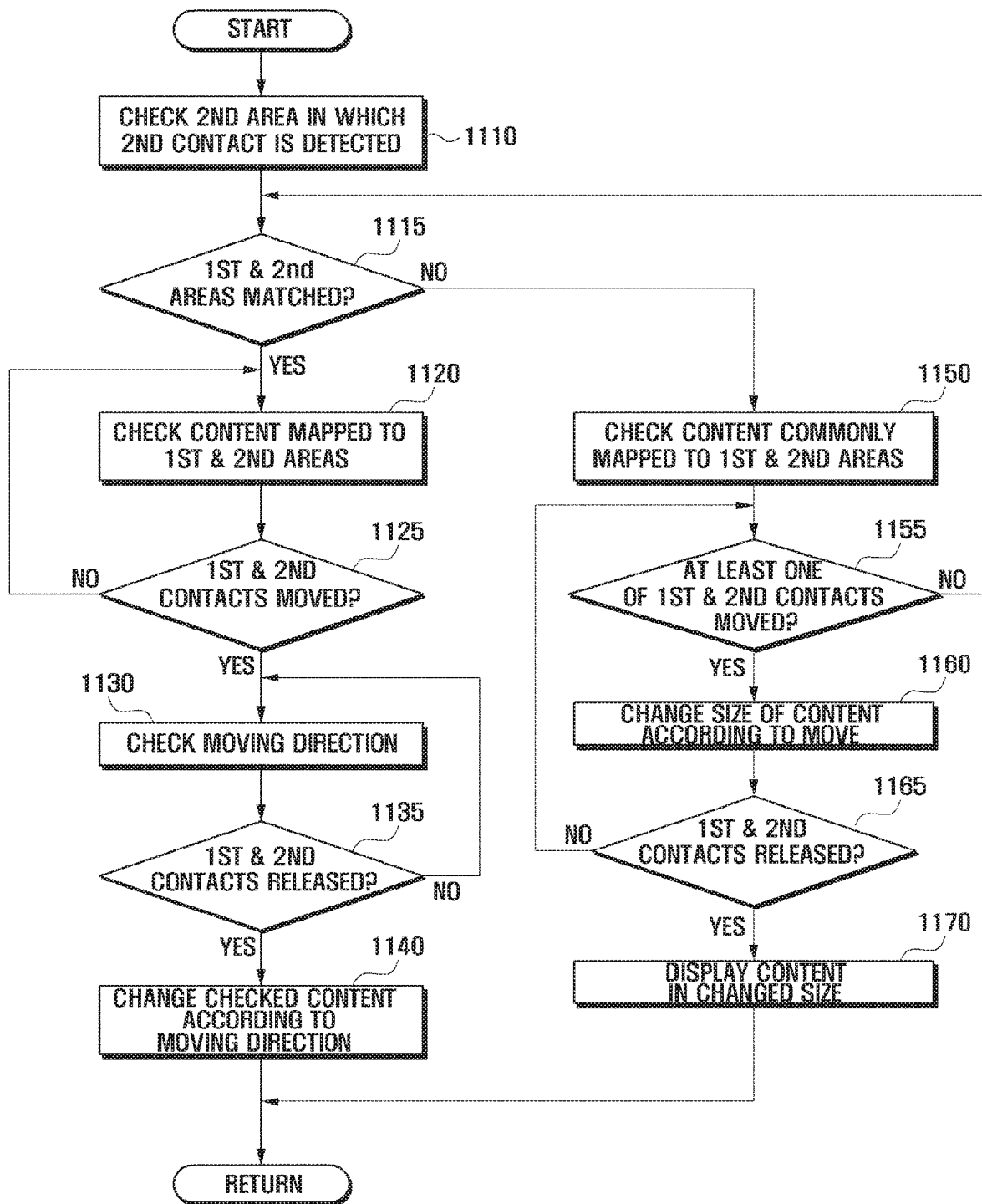
FIG. 11 is a flowchart of a process for illustrating a method of controlling content associated with a detected touch event, according to exemplary embodiments of the present invention.

According to exemplary embodiments, a method of controlling content 165 according to a touch event detected in the mobile terminal will be described in detail with reference to FIG. 9, FIG. 10, FIG. 11, and FIG. 9 is a flowchart of a process for illustrating a method of controlling content, according to exemplary embodiments of the present invention.

Referring to FIG. 9, the control unit 150 may display the content 165 to the display unit 130 according to user selection, per step 910. In this case, the content 165 may include any object typically to be displayed in the mobile terminal, for example, a menu icon to select a function that can be performed in the mobile terminal, a multimedia icon to reproduce music data and moving picture data, and an image stored in the mobile terminal.

The control unit 150 may determine, in step 920, whether the first contact is detected by the touch screen 110. When the first contact is detected, the control unit 150 may check the first area whether the first contact is detected, in step 930. The control unit 150 may check an area where the first contact that is transmitted from the touch screen 110 can be detected. As in step 940, the control unit 150 may determine whether the first contact is released from the touch screen 110. When the first contact is released, the control unit 150 may control the content 165 of the first area where the first contact is detected, per step 950.

In step 940, when the first contact is not released, the control unit 150 may determine, per step 960 whether the second contact can be detected by the touch screen 110. In more detail, the control unit 150 may determine whether the second contact is detected on a surface matched to surfaces including the areas of the front and rear sides where the first contact is detected. When the second contact is detected, the control unit 150 may control, in step 970, the content 165 according to the detected first and second contacts.

As in step 950, the operation wherein the first contact is detected in the first area and released will be described with reference to FIG. 10. FIG. 10 is a flowchart of a process for illustrating a method of controlling content based on an area at which a touch event is detected, according to an exemplary embodiment of the present invention.

Referring to FIG. 10, when the first contact is detected in the first area and is released, the control unit 150, in step 1010, may determine whether the first contact and the release of the first contact are detected in the front side of the display unit 130. The control unit 150 may check an area where a coordinated event applied in which the first contact and release of the first contact are detected, and the coordinated event is transmitted from the touch screen 110. The control unit 150 may determine whether the first contact and release of the first contact are detected by the front touch sensor 120 or the rear touch sensor 140 by determining the coordinated event. When the coordinated event is detected from the front touch sensor 120, the control unit 150 may determine whether the first contact and release of the first contact are detected at the front side of the display unit 130. When the coordinated event is detected from the rear touch sensor 140, the control unit 150 may determine whether the first contact and release of the first contact are detected on the rear side of the display unit 130.

When the first contact and release of the first contact are detected at the front side, the control unit 150 may perform, in step 1020, a function using the content 165. For example, for the illustration purpose it is assumed that at least one content 165 can be displayed to reproduce music data. A user may touch an area of the front side of the display unit 130 where the content 165 can be displayed with a finger and releases the finger from the area in order to select the music data. Then, the control unit 150 may detect the contact and release of the contact by the user finger applied to and from the front side of the display unit 130 through the touch screen 110. The control unit 150 may reproduce the music data corresponding to the content 165 that can be mapped to the area at which the user finger contacts and releases.

Alternately, when the first contact and release are detected on the rear side of the display unit 130, the control unit 150 may display detailed information of the content 165 that can be mapped to the first area, per step 1030. For example, for the illustration purpose, it is assumed that a thumbnail indicating an image that is stored in the mobile terminal can be displayed of the content 165. A user can touch the rear side of the display unit 130 in which the desired thumbnail can be displayed with a finger and can release the finger from the area. Then, the control unit 150 may display detailed information corresponding to the thumbnail that can be mapped to the area at which the user finger touches and releases. In this example, the detailed information may be a stored date, stored time, and a capacity of the image corresponding to the thumbnail.

The operation of the content 165 can be controlled according to the detected touch event will be described with reference to FIG. 11. FIG. 11 is a flowchart of a process for illustrating a method of controlling content associated with a detected touch event, according to an exemplary embodiment of the present invention.

Referring to FIG. 11, when the first contact is detected and the second contact is detected followed by the first contact from the touch screen 110, the control unit 150 may check, in step 1110, whether the second area to which the second contact is detected. The control unit 150 may determine whether the area to which the first contact is detected can be matched to the area to which the second contact is detected, per step 1115. In more detail, it is assumed that the first contact can be detected by the front touch sensor 120 and the second contact can be detected by the rear touch sensor 140. Then, the control unit 150 may determine whether a coordinated event occurs according to the first area, where the first contact is detected from the front touch sensor 120 and to the second area, where the second contact is detected from the rear touch sensor 140 that are matched to each other.

When the first area is matched to the second area, the control unit 150 may check, in step 1120, whether content 165 can be mapped to the first area or the second area. The control unit 150 may determine, per step 1125, whether the first contact and the second contact an be moved. When the first contact and the second contact are moved, the control unit 150 may check, in step 1130, moving directions of the first and second contacts through the touch screen 110. The control unit 150 may control the display unit 130 to display the movement of the content 165 according to the moving directions of the first and second contacts. The control unit may determine whether the first and second contacts can be released, per step 1135. When the first and second contacts are released, the control unit 150 may change a position of the checked content 165 according to the moving direction, per step 1140. For example, when the first contact and second contact are moved inward from the border line 135 of the display unit 130 and the first contact and the second contact are released, the control unit 150 may move the content 165 displayed on the display unit 130 into the area from which the first and second contacts are released. However, when the first and second contacts are moved to the outside of the border line 135 of the display unit 130, the control unit 150 may delete the content 165 from the display unit 130.

Although illustrated exemplary embodiments are based on movement of the contacts, when the first and second contacts are not moved, in step 1125, the control unit 150 may control zoom in or zoom out the content 165 according to the first and second contacts. For example, the content 165 may be zoomed in or out according to duration time when the first contact and second contact are applied and maintained. In other words, when the first and second contacts are maintained for a preset time, the control unit 150 may check the content 165 whether mapped to an area in which the first and second contacts can be detected. When the first and second contacts are released, the control unit 150 may zoom in or out the checked content 165 with respect to the area in which the first and second contacts are detected as a reference point.

Alternately, the content 165 may be zoomed in or out according to a size of the area in which the first and second contacts are detected. In more detail, the control unit 150 may check a size of the area in which the first and second contacts are detected. When the size of the checked area is larger than a preset size, the control unit 150 may zoom in or out the checked content 165 with respect to the area in which the first and second contacts are detected as a reference point.

When the first area and the second area are not matched to each other, in step 1115, the control unit 150 may check predetermined content 165 commonly mapped to the first and second areas, per step 1150. The control unit 150 may determine, in step 1115, whether at least one of the first contact and second contact can be moved through the touch screen 110.

When the at least one contact moves, the control unit 150 may change a size of the content 165 according to the movement, per step 1160. In this case, the control unit 150 may control the display unit 130 to display the size of the content 165 to be changed according to the first contact and second contact. In more detail, when at least one contact moves, the control unit 150 calculates a distance between the first contact and second contact caused by the movement of the at least one contact through the touch screen 110. The distance may be checked with a distance applied between the first area in which the first contact is detected and the second area in which the second contact is detected. The control unit 150 may increase or decrease the size of the content 165 according to the distance. The control unit 150 may rotate the content 165 according to the movement of a contact. For example, when the first contact is applied and the movement of the second contact is detected by the touch screen 110 based on the first contact which is fixed, the control unit 150 may rotate the content 165 based on the first area in which the first contact is detected and according to the movement of the second contact. Alternatively, when the second contact is fixed and the movement of the first contact is detected from the touch screen 110, the control unit 150 may rotate the content 165 based on the second area in which the second contact is detected and according to the movement of the first contact.

The control unit 150 may determine, in step 165, whether the first and second contacts can be released through the touch screen 110. When the first contact and second contact are released, the control unit 150 may control the display unit 130 to display the content 165 in a changed size, per step 1170.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method comprising:
   displaying a screen including at least one icon at a display;
   detecting a first touch gesture on the at least one icon while a second touch gesture on the at least one icon is being detected;
   performing a function related to the at least one icon in response to the detecting of the first touch gesture and the second touch gesture, wherein the first touch gesture is detected on a front side of the display by a first touch sensor and the second touch gesture is detected on a rear side of the display by a second touch sensor; and determining whether a first area where the first touch gesture is detected and a second area where the second touch gesture is detected are at a same location on opposite sides of the display with the at least one icon therein between; and changing a position of only the at least one icon based on the determining that the first area and the second area are at the same location and based on the first touch gesture and the second touch gesture moving together in the same direction.

2. The method of claim 1, further comprising:

determining whether the first and the second touch gestures move to outside of a border line; and deleting the at least one icon when the first and the second touch gestures move to outside of a border line in the same direction.

3. The method of claim 1, further comprising:

zooming in or zooming out the screen in response to the first and the second touch gestures based on the first touch gesture being a gesture of touching and pressing the front side of the display and the second touch gesture being a gesture of touching and pressing the rear side of the display.

4. The method of claim 3, wherein the zooming in or zooming out the screen in response to the first and the second touch gestures comprises:

detecting a pressure of the first and the second touch gestures applied to the display; and zooming in or zooming out the screen in response to the detecting the pressure of the first and the second touch gestures applied to the display.

5. The method of claim 3, wherein the zooming in or zooming out the screen in response to the first and the second touch gestures comprises:

determining sizes of a first area and a second area; and zooming in or zooming out the screen in response to the sizes of the first area and the second area.

6. The method of claim 3, wherein the zooming in or zooming out the screen in response to the first and the second touch gestures comprises:

determining a duration of time for which the first and the second touch gestures are maintained; and zooming in or zooming out the screen in response to the zooming in or zooming out the screen in response to the duration of time.

7. The method of claim 1, further comprising:

determining a distance between the first and the second areas based on the first touch gesture moving in a first direction from the first area and the second touch gesture moving in a second direction opposite to the first direction from the second area;

enlarging a size of at least one content included in the screen when the distance increases; and reducing a size of the at least one content when the distance decreases.

8. The method of claim 1, further comprising:

performing a first function associated with an execution of an application represented by the at least one icon in response to detecting only the first touch gesture; and performing a second function associated with the execution of the application represented by the at least one icon in response to detecting only the second touch gesture, wherein the first function and the second function are different functions.

9. An electronic device comprising:

a display;

a first touch sensor disposed at a front side of the display;

a second touch sensor disposed at a rear side of the display; and a processor electrically connected to the display and the first and the second touch sensors;

wherein the processor is configured to:

display, at the display, a screen including at least one icon;

detect a first touch gesture on the at least one icon while a second touch gesture on the at least one icon is being detected;

perform a function related to the at least one icon in response to the detecting of the first touch gesture and the second touch gesture, wherein the first touch gesture is detected on the front side of the display by the first touch sensor and the second touch gesture is detected on the rear side of the display by the second touch sensor;

determine whether a first area where the first touch gesture is detected and a second area where the second touch gesture is detected are at the same location on opposite sides of the display with the at least one icon therein between; and change a position of only the at least one icon based on the first area and the second area being determined to be at the same location and based on the first touch gesture and the second touch gesture moving together in the same direction.

10. The electronic device of claim 9, wherein the processor is further configured to:

determine whether the first and the second touch gestures move to outside of a border line; and delete the at least one icon when the first and the second touch gestures move to outside of a border line in the same direction.

11. The electronic device of claim 9, wherein the processor is further configured to:

zoom in or zoom out the screen in response to the first and the second touch gestures based on the first touch gesture being a gesture of touching and pressing the front side of the display and the second touch gesture being a gesture of touching and pressing the rear side of the display.

12. The electronic device of claim 11, wherein the processor is further configured to:

detect a pressure of the first and the second touch gestures applied to the display; and zoom in or zoom out the screen in response to the detecting the pressure of the first and the second touch gestures applied to the display.

13. The electronic device of claim 11, wherein the processor is further configured to:

determine sizes of a first area and a second area; and zoom in or zoom out the screen in response to the sizes of the first area and the second area.

14. The electronic device of claim 11, wherein the processor is further configured to:

determine a duration of time for which the first and the second touch gestures are maintained; and zoom in or zoom out the screen in response to the zooming in or zooming out the screen in response to the duration of time.

15. The electronic device of claim 9, wherein the processor is further configured to:

determine a distance between the first and the second areas based on the first touch gesture moving in a first direction from the first area and the second touch gesture moving in a second direction opposite to the first direction from the second area;
enlarge a size of at least one content included in the screen when the distance increases; and
reduce a size of the at least one content when the distance decreases.

16. The electronic device of claim 9, wherein the processor is further configured to:
perform a first function associated with an execution of an application represented by the at least one icon in response to detecting only the first touch gesture; and
perform a second function associated with the execution of the application represented by the at least one icon in response to detecting only the second touch gesture,
wherein the first function and the second function are different functions.

* * * * *